(12) United States Patent
Assa

(10) Patent No.: US 8,255,513 B2
(45) Date of Patent: Aug. 28, 2012

(54) TOPOLOGY INFORMATION SYSTEM FOR A MANAGED WORLD

(75) Inventor: Shmuel Assa, New York, NY (US)

(73) Assignee: Hewlett-Packard, Caribe B.V., Aguadilla, PR (US)

( * ) Notice: Subject to any disclaimer, the term of this patent is extended or adjusted under 35 U.S.C. 154(b) by 3160 days.

(21) Appl. No.: 10/450,242

(22) PCT Filed: Dec. 14, 2001

(86) PCT No.: PCT/IB01/02841
§ 371 (c)(1),
(2), (4) Date: Sep. 29, 2003

(87) PCT Pub. No.: WO02/48910
PCT Pub. Date: Jun. 20, 2002

(65) Prior Publication Data
US 2004/0059812 A1    Mar. 25, 2004

Related U.S. Application Data

(60) Provisional application No. 60/255,123, filed on Dec. 14, 2000.

(51) Int. Cl.
*G06F 15/173*    (2006.01)
(52) U.S. Cl. .................................... 709/224; 709/223
(58) Field of Classification Search .......... 709/223–224; 707/103 r
See application file for complete search history.

(56) References Cited

U.S. PATENT DOCUMENTS

| | | | |
|---|---|---|---|
| 5,185,860 A | | 2/1993 | Wu |
| 5,568,605 A | * | 10/1996 | Clouston et al. .................. 714/4 |
| 5,774,669 A | * | 6/1998 | George et al. ................ 709/224 |
| 5,787,252 A | * | 7/1998 | Schettler et al. .............. 709/224 |
| 5,848,243 A | * | 12/1998 | Kulkarni et al. .............. 709/224 |
| 5,878,431 A | | 3/1999 | Potterveld et al. |
| 5,948,055 A | | 9/1999 | Pulsipher et al. |
| 5,960,439 A | * | 9/1999 | Hamner et al. ........... 707/103 R |
| 6,225,999 B1 | * | 5/2001 | Jain et al. ...................... 715/734 |
| 2001/0042118 A1 | * | 11/2001 | Miyake et al. ................ 709/223 |
| 2002/0073338 A1 | * | 6/2002 | Burrows et al. .............. 713/201 |
| 2003/0046390 A1 | * | 3/2003 | Ball et al. ...................... 709/224 |
| 2004/0223461 A1 | * | 11/2004 | Scrandis et al. .............. 370/242 |

OTHER PUBLICATIONS

Guo, M., "An object-oriented SQL (OSQL) based on association pattern query formulation", Proceedings of the International Phoenix Conference on Computers and Communications, Tempe, Mar. 23-26, 1993, New York, IEEE, US, vol. Conf. 121, Mar. 23, 1993, pp. 231-237.*

* cited by examiner

*Primary Examiner* — Kenny Lin
*Assistant Examiner* — Noel Beharry

(57) ABSTRACT

A topology information system, comprising a topology collection sub-system, a topology database, a topology query sub-system and a topology correlation sub-system. The topology collection sub-system includes at least one topology discovery agent. The topology collection sub-system automatically collects topology information from at least one topology layer of at least one managed world. The topology database is adapted to store the topology information collected by the topology collection sub-system. The topology query sub-system is adapted to query the topology information stored in the topology database using a topology pattern query created by a user. The topology correlation sub-system operates in parallel to the topology query sub-system, constantly monitoring the managed world for events and updating the Information Base accordingly.

41 Claims, 17 Drawing Sheets

TOPOLOGY INFORMATION SYSTEM FOR A MANAGED WORLD

This Application claims priority from a co-pending U.S. Provisional Application Ser. No. 60/255,123, titled "A system for enabling Automatic Application Pattern Recognition", filed Dec. 14, 2000, the contents of which are incorporated herein by reference.

FIELD

This disclosure teaches novel techniques for developing a topology information system for a managed world. An example of such a managed world is a business information technology (IT) infrastructure. Specifically, the topology of the managed world is comprehensive. In the example of the business IT infrastructure includes hardware, software as well as applications programs. A skilled practitioner would know that the comprehensive managed world of a business IT infrastructure could include multiple topology layers at least including Networks, Protocols, Servers, Operating Systems, Databases, Queuing, Web Servers, Information Models, Processes etc.

BACKGROUND

An issue in Network & System Management (NSM) relates to the need to manage Business Services within the managed world of a business IT infrastructure. A Business Service is a specific example of a topology pattern within the business IT infrastructure. As noted above, a business IT infrastructure is an example of a managed world. A Business Service represents a set of cooperating technology components enabling the operation of a specific function within the Business. It can include multiple topology layers, including, Networks, Protocols, Servers, Operating Systems, Databases, Queuing, Web Servers, Information Models, Processes etc.

It should be noted that the term Business refers to any type of business and is not restricted to commercial or any other specific types of business. For example, business could mean a financial operation (commercial banks, investment banks, trading companies, etc). On the other hand, business could also mean a technical operation. For example, a chemical or a biotechnological process could be a business.

It should be clear to a skilled artisan that an application, for example, a biotech process, could be modeled as a managed world. In such a case, the topology layers could also include the components (topology objects) of the biotech molecule. All such applications are also contemplated to be within the scope of the disclosed teachings.

In short, the disclosed teachings could be used in any field of application, including but not limited to scientific, commercial, etc, where a topology graph (as the term is used in graph theory) can be used to model (or represent components in) the application.

1. Definitions

To better understand the teachings in this disclosure, a set of definitions are provided herein:

Managed World==any self-contained environment that can be described using a topology model Topology Layer==a sub-set of topology objects within the Managed World having a common classification Topology Pattern==a unique architecture of topology classes within a managed world inclusive of all connections and interdependencies (e.g., a business service)

Event==some change that occurs in the Managed World

Topology Object==any member of a class that exists within the topology of the Managed World Viewing Layer==a two-dimensional arrangement of topology objects for the purpose of viewing by a user In this context, managing a Business IT Infrastructure as a representative example of a managed world includes at least the following functions:

1. Discovery and population of the Information Technology (IT) components and the relationships between them.
2. Recognition of all the relevant components of each topology pattern. As noted above, this includes all the topology layers including those related to hardware, software and components.
3. Viewing of the objects with the topology pattern inclusive of all relationships.
4. Monitoring the topology objects Performance and Availability.
5. Remotely control the topology objects within the Business IT Infrastructure.

Any topology information system (TIS) should solve the first three functions including discovery, recognition and viewing of topology objects and topology patterns within the managed world. The disclosed techniques are aimed at implementing a Topology Information System as well as other functions that provide a comprehensive solution for such applications as Business Service Management.

Potential users for such a system include, but are not limited to: Enterprises, Telecommunication companies, Service Providers, Business Service Management Solution Vendors, Management Application Vendors, Management Service Providers, Integrators, Scientists and the Intelligence community.

Current Solutions (Business Service Management)

1. Discovery

Conventional solutions use combinations of centralized discovery for network topologies and agents for system and applications monitoring. Such solutions cannot discover more advanced topologies such as queuing architectures, middleware, etc.

2. Pattern Recognition

Conventional solutions can only discover the objects of a managed world but cannot recognize the topology pattern itself within a managed world. This deficiency becomes increasingly problematic as the size of the managed world grows and the quantity of topology objects and events increases to an unmanageable level.

3. Viewing

Conventionally, the problem with viewing a set of topology objects involves at least three 3 methods:

1. Automatic—Layout Algorithms that automatically set the (x,y) coordinates of each object in the view.
2. Fixed Logic—Use of Fixed Logic to organize the objects, e.g. Group of Computers by Networks, Group of Interfaces by Network Devices etc. The objects on each viewing layer are presented using the Automatic Layout algorithms noted above.
3. Manual—Users manually group objects together in the view according to some selection criteria, e.g. By Cities, By Building, By Logic Grouping, By Business Services etc.

A viewing method available is the Hyperbolic View. The Hyperbolic View can portray the knowledge base as a sphere that "zooms in" (like a magnifying glass) in the center of the view and becomes smaller along the edges. Users are able to browse the world by changing the center point and see more details on different parts of the sphere.

It is clear that as the number of topology objects increases in the typical managed world, the manual method becomes highly inefficient. Users find themselves with hundreds of topology objects in a single viewing layer after completing the Fixed Logic method. On the other hand, even if the users end up doing a good job manually, their results are hard to maintain and limit other users, perhaps who are not as skilled, from presenting the same knowledge base according to their needs or point of view. It will be advantageous to have techniques that overcome some of the above-mentioned problems.

SUMMARY

To overcome the problems noted above, there is provided a topology information system, comprising a topology collection sub-system, a topology database, a topology query sub-system and a topology correlation sub-system. The topology collection sub-system includes at least one topology discovery agent. The topology collection sub-system automatically collects topology information from at least one topology layer of at least one managed world. The topology database is adapted to store the topology information collected by the topology collection sub-system. The topology query sub-system is adapted to query the topology information stored in the topology database using a topology pattern query created by a user.

Another aspect of the disclosed teachings is a topology query language (TQL) system for querying a topology database. The TQL system comprises at least one TQL pattern.

Also important in the disclosed teachings is the topology correlation sub-system for distinguishing between the "casual" and "affect" objects of a fault or problem within the managed world. The topology correlation sub-system operates in parallel to the topology query sub-system, constantly monitoring the managed world for events and updating the Information Base accordingly.

Yet another aspect of the disclosed teachings is a topology viewing sub-system adapted to display at least a view of a topology data. The system comprises at least one display rule. The display rule is capable of organizing views corresponding to the topology data in multiple layers.

BRIEF DESCRIPTION OF THE DRAWINGS

The above objectives and advantages of the disclosed teachings will become more apparent by describing, in detail, preferred embodiments thereof with reference to the attached drawings in which.

DETAILED DESCRIPTION

Figure 1:
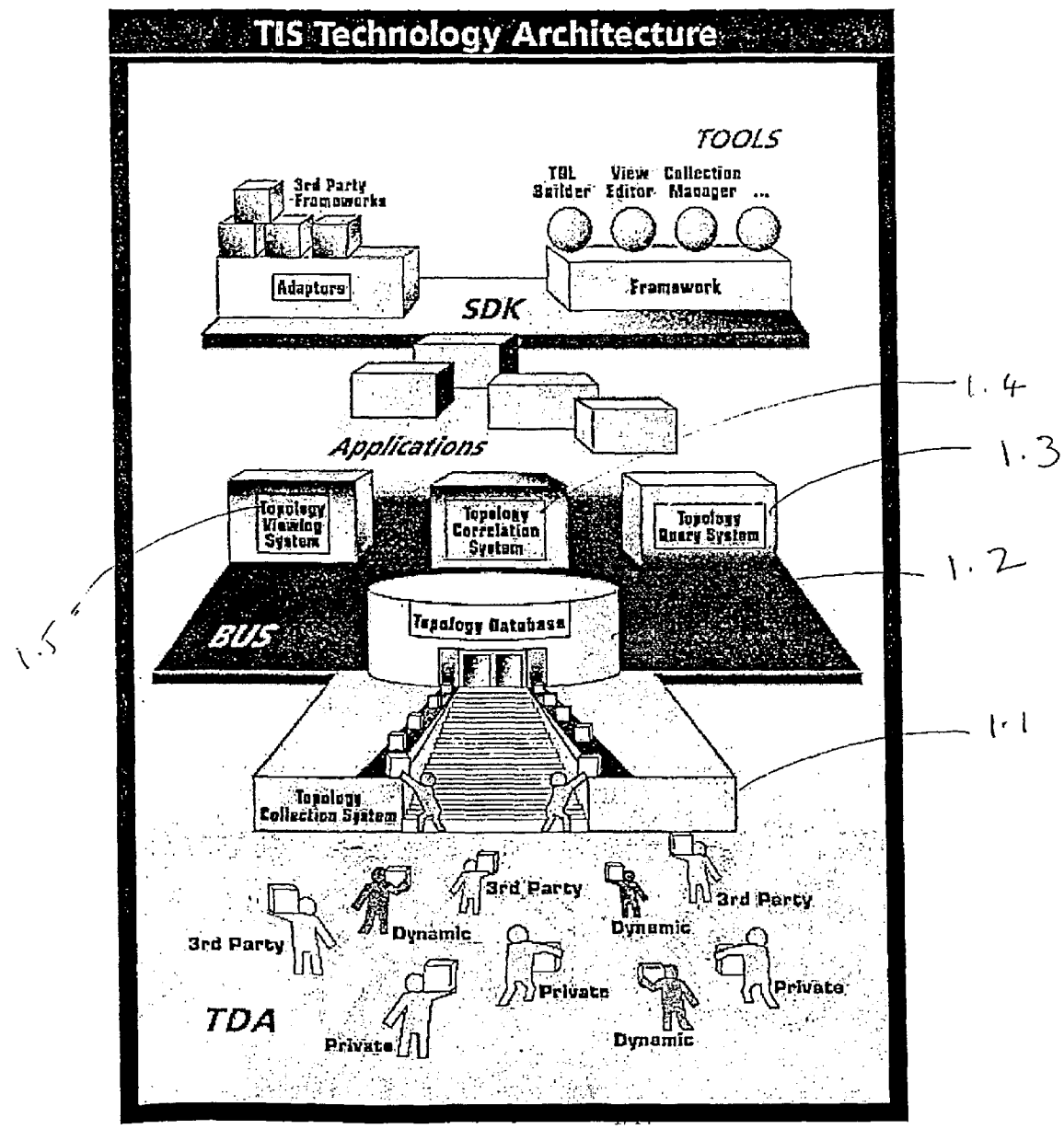
FIG. 1 shows an illustrative example of a topology information system that embodies the disclosed teachings.
Figure 2:
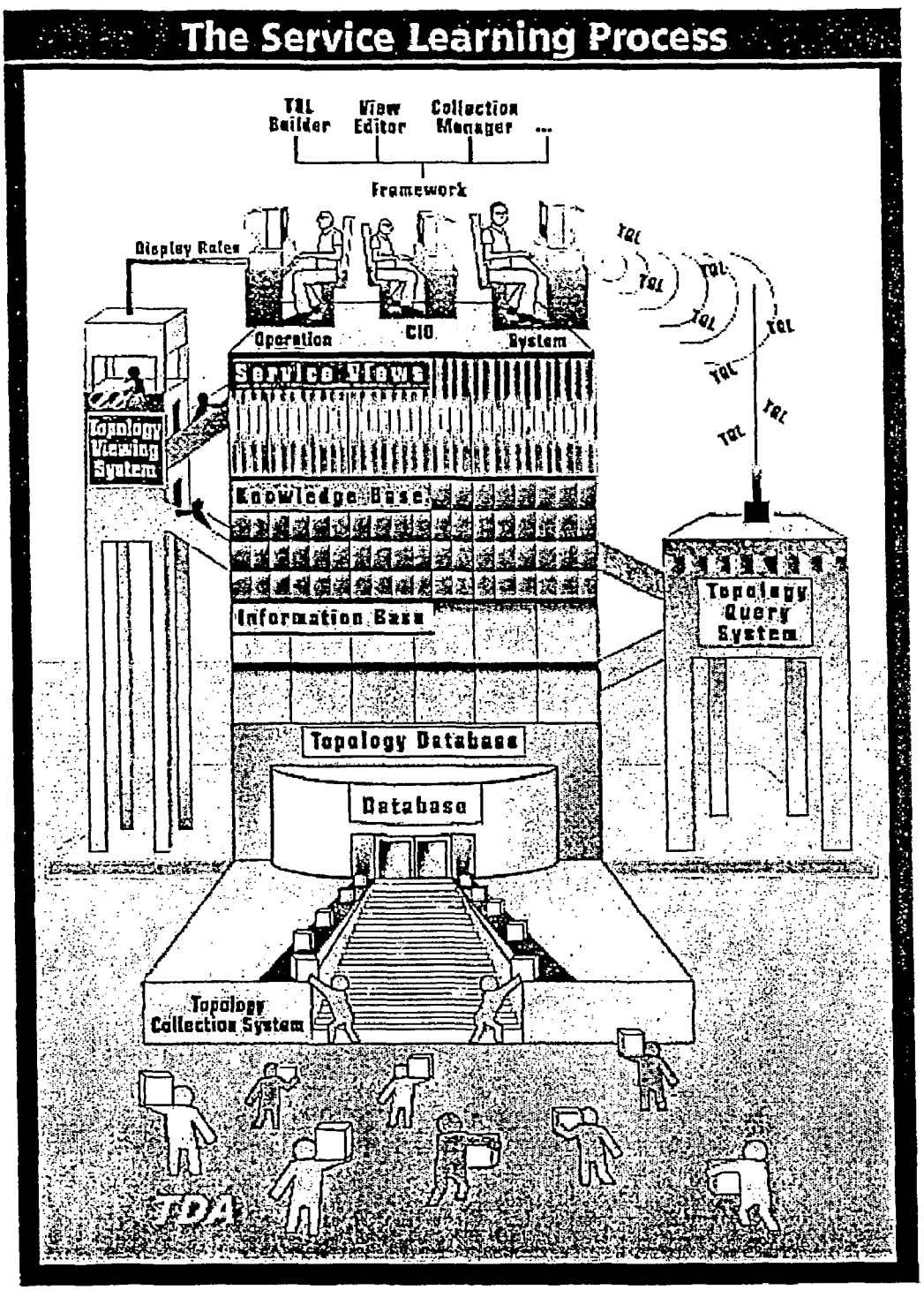
FIG. 2 shows a managed world learning process that embodies the disclosed teachings.
Figure 18:
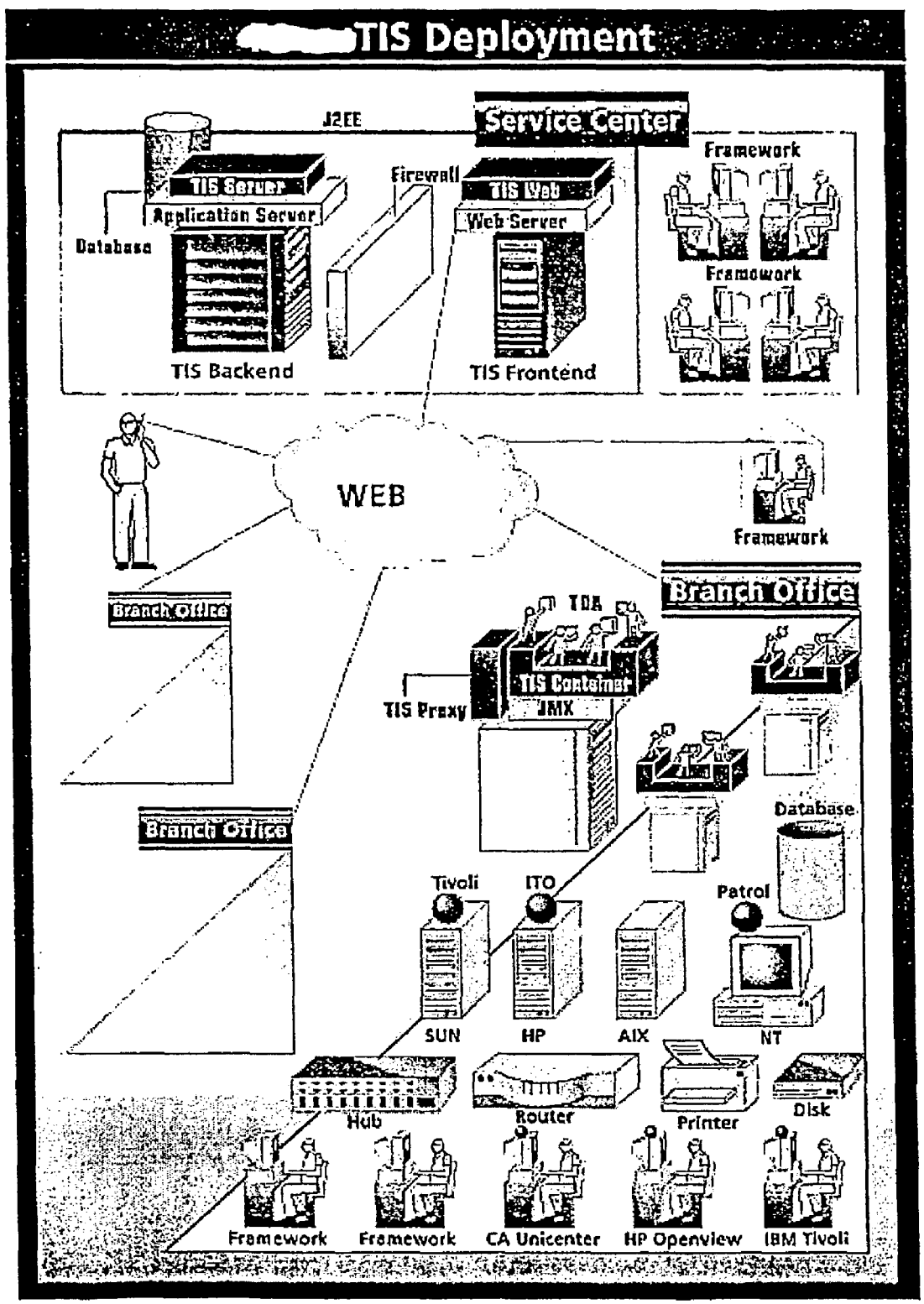
FIG. 18 shows an illustrative self-explanatory example deployment of an example system embodying the disclosed teachings.

An exemplary embodiment of the disclosed teachings is a Topology Information System (or TIS) shown in FIG. 1 and is described further herein. It integrates, manages and displays all of the topology objects within any managed world. For example, such a Topology Information System can be used for multiple purposes within any business enterprise from comprehensive applications management to intelligent asset management to complete business service management—as required. FIG. 18 shows an illustrative self-explanatory example deployment of such an example system.

The Topology Information System, described herein, involves five (5) collaborating sub-systems:
   Topology Collection Sub-system 1.1
   Topology Database 1.2
   Topology Query Sub-system 1.3
   Topology Correlation Sub-system 1.4
   Topology Viewing Sub-system 1.5

The Topology Collection Sub-system 1.1 includes a wide array of Topology Discovery Agents (TDAs) that automatically collects real-time topology information from the managed world, storing it within the Topology Database. The managed world can be any self-contained that can be described using a topology model and consists of one or more instances of objects (belonging to various object classes). It should be noted that the terms objects and object classes refer to their ordinary meaning as used in objected-oriented architecture.

The Topology Collection Sub-system is self-maintaining through its ability to interrogate the TDA Proxies and automatically deploy additional TDAs and TDA tasks when new object classes are discovered in the enterprise topology or removing TDA tasks for objects that have been decommissioned. The collection sub-system can be extended by the user through the ability to define and customize dynamic rules for TDAs to collect information from SNMP Agents, SQL databases, HTTP servers, etc. in the case of the business IT infrastructure application. The Topology Collection Sub-system can also integrate the topology information gathered from external "agents" and "data sources" used with existing frameworks (e.g., BMC Patrol™, IBM Tivoli™, Concord SystemEdge™, HP Openview™, CA Unicenter™, etc.) already deployed throughout the enterprise—maximizing existing investments while minimizing the impact of the topology information collection process.

Once the Topology Database for a managed world is established, the Topology Query Sub-system, dynamically queries the topology information in the database using the topology patterns created by the user with the Topology Query Language (TQL). Each of these topology patterns represents a unique architecture of topology classes within a managed world inclusive of all connections and interdependencies (e.g., a business service). These patterns expressed in the TQL are easily created with the drag-and-drop TQL Builder. The object-oriented nature of TQL enables the TQS to automatically recognize and adapt to any changes in the managed world, eliminating the need for any further maintenance. These TQL patterns enable the unique learning process within the Topology Information System that results in the creation of a dynamic knowledge-base of the entire managed world.

The Topology Correlation Sub-system operates in parallel to the Topology Query Sub-system, constantly monitoring for events from the managed world and updating the Information Base according to these events. The Topology Correlation Sub-system can immediately identify the root cause of any problem within the managed world in part because of the knowledge of topology patterns contained within the Knowledge Base.

At the user level, the Topology Viewing Sub-system can tap into the dynamic knowledge base created by the Topology Query Sub-system to display any view of the topology required. A key part of the Topology Viewing Sub-system is its powerful display rules that enable the user to easily create personalized views of any set of topology objects within the managed world. An added benefit of the object-oriented nature of the Topology Viewing Sub-system display rules means that users are finally free from the costly effort of maintaining such custom views. Once defined, each personalized view is self-maintaining, thereby adapting to any change in the managed world's topology.

In summary, the TIS enables the manipulation of the topology objects from the managed world. The "manipulation" includes Populating the Information Base, Storing the Information, Querying the Information Base to build the Knowledge Base and Organizing the Knowledge into manageable views.

I.A. Topology Database

The Topology Database is an Object-Oriented Graph of Objects (Vertexes) and Links (Edges), known as G(V,E) in Graph Algorithm Theory. Each Object or Link is from a specific Class that has Class attributes and behaviors (Presentation, Events, Commands etc.). These Class definitions are known as Topology Database Class Models. Each Class Model is unique per managed world while totally flexible and configurable by the TIS user. A Class Model can include topology objects, links and all available relationships between topology objects in the managed world.

The Topology Database is multi layered, e.g.: the same database can store multiple Class Models. In practice, the TIS itself is multi-layered, e.g. The Information Base, the Knowledge Base and the Views, all of which are described below, are stored as multi-layered Topology Databases. The Topology Database can be implemented as a stand-alone database or layered upon a relational database. The Topology Database is a unique database technology, comparable to other well-known database technologies such as the Relational Database, Object Database, XML Database, etc.

The following are logical models of the Topology Information System defined using the Topology Database technology.

I.B. Information Base

The Information Base establishes the necessary differentiation between the multiple environments across which the TIS can be implemented. The Information Base stores instances of the TIS Extendible Class Models. The Information Base is populated by Agent technology (from the Topology Collection Sub-system) that has at least some of the capabilities listed herein.

Agents are able to discover all kinds of Objects and Links within the Information Base Class Model.

Agents are able to monitor the Attributes of those Objects in real-time.

Agents are distributed and are hot deployed according to TQL (describe in subsequent sub-section) Triggers.

Dynamic Rule Agents can be configured to discover new classes of information from standard resources (SNMP Agent, SQL Data Sources, etc.).

Agents can interface with other Agents and populate the Information Base with the information collected by these "other" Agents.

The library of Agents is extendable through the availability of a Software Development Kit (SDK).

I.C. Knowledge Base

The heart of the Topology Information System is its ability to transform the topology objects contained within the Information Base into knowledge according to one or more topology patterns. These topology patterns are defined by the user with the Topology Query Language (TQL). TQL is an extension to the Structured Query Language (SQL) that enables the definition of topology/graphic queries capable of selecting specific topology patterns from within any Information Base. By defining the topology patterns in the TQL, the user essentially "teaches" the TIS about each topology pattern. The transition from Information Base to Knowledge Base is then complete when the Topology Query System "learns" about each topology pattern by querying the Information base using each pattern expressed in TQL.

Figure 3:
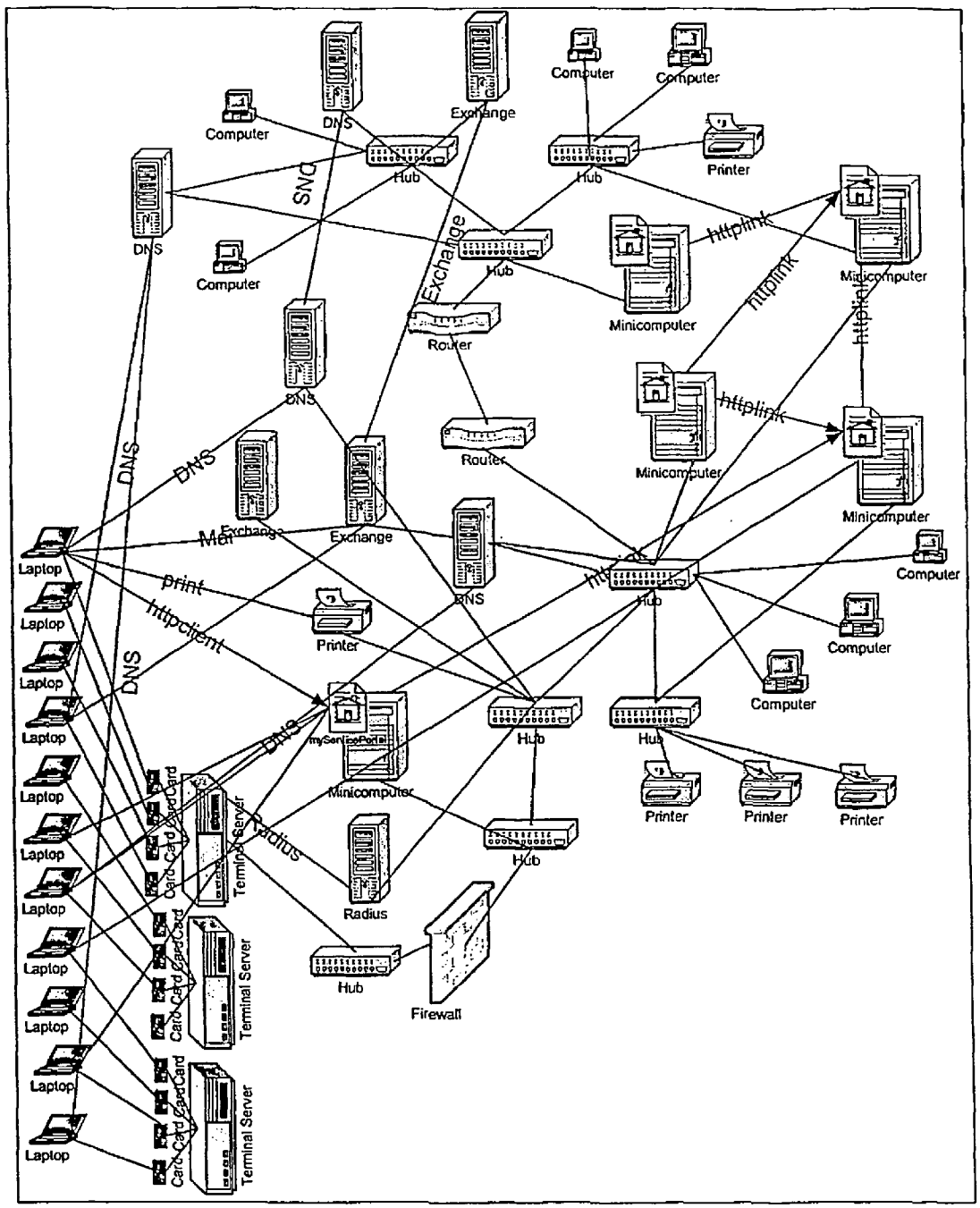
FIG. 3 shows an example of an information base as it might exist on top of a topology database.

FIG. 3 demonstrates the complexity of the typical Information Base as it might exist on top of Topology Database. While the details in FIG. 3 are not important, from this complex figure it becomes obvious that some filtering language is required to facilitate effective management by a human operator of this topology.

Figure 5:
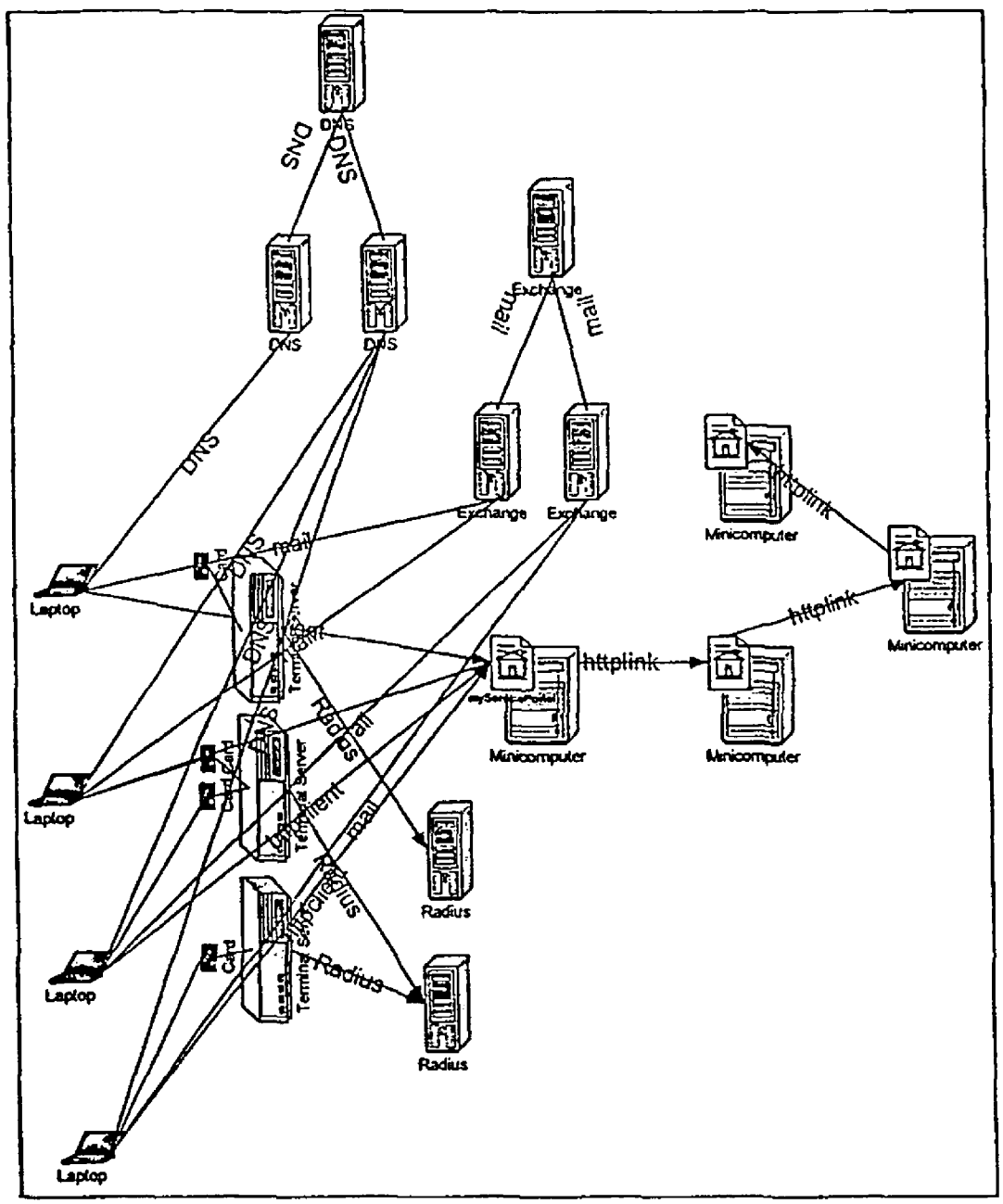
FIG. 5 shows an example of the service knowledge that is a the management view generated after the topology pattern defined using TQL of FIG. 4 is applied to the information base of FIG. 3.

FIG. 5 is the management view generated after the topology pattern defined using TQL is applied to the Information Base shown in FIG. 3. This particular example in FIG. 5 demonstrates the service view of a typical intranet service. The 'core' of the service is a web portal that few users in the enterprise use. Those users are so important to the portal management team that they want to take care on their intranet/internet basic services as well. The service view includes all the relevant resources for the operation of the portal users, including their DNS, Mail and the portal itself. Should a problem arise in the network infrastructure, the DNS, the Mail servers or in the portal web servers the root cause of problem will be highlight immediately in this focused view.

Figure 4:
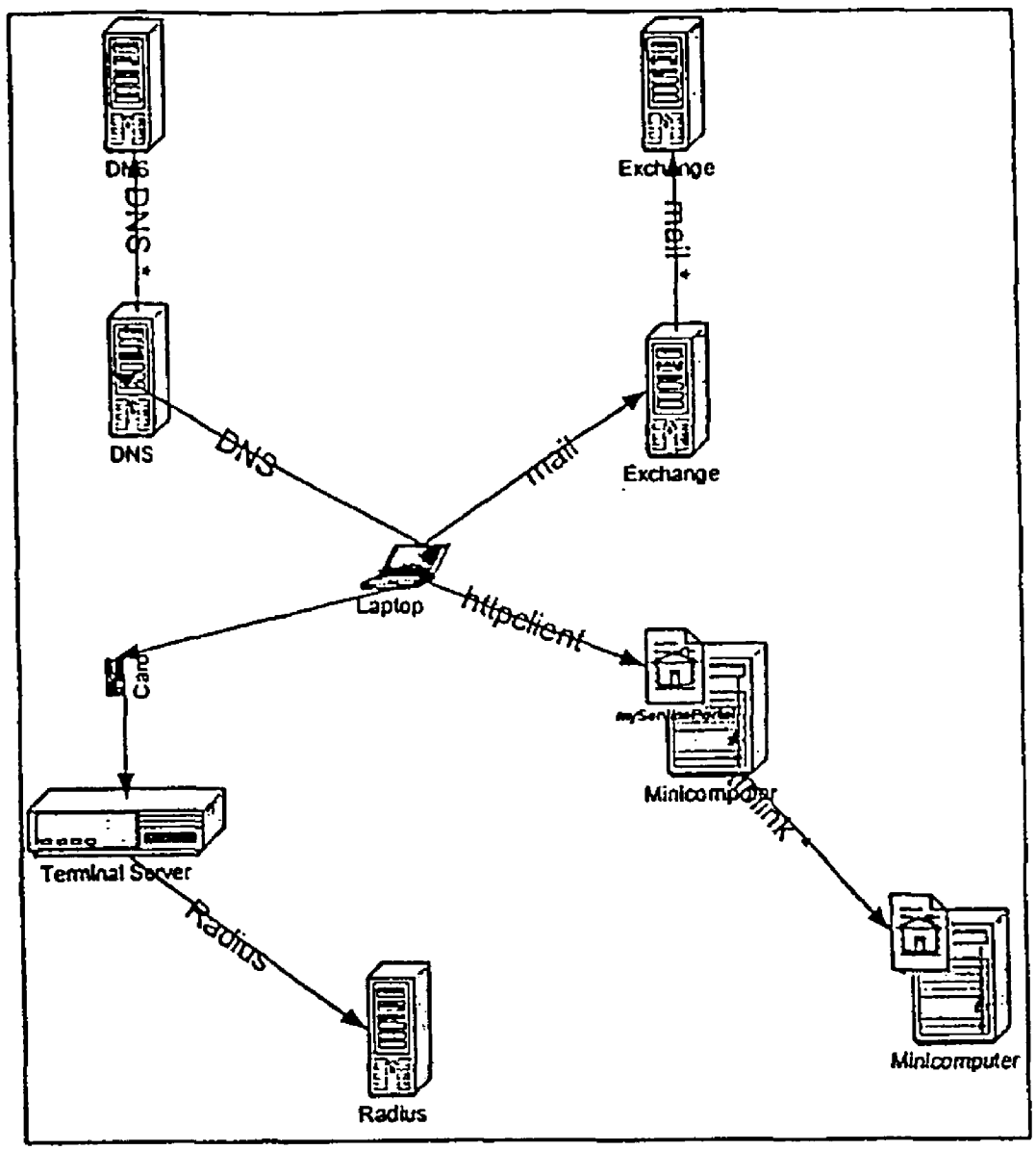
FIG. 4 shows an example of a TQL.

FIG. 4 shows how easy the definition of the above Intranet Service view can be using TQL. The only thing the user needs to define is the "class architecture" of the service using functions like the route( ) function in the picture, without a priori knowledge of the actual output of that "class architecture" such as that shown in FIG. 5.

I.D. Viewing Sub-System Display Rules

The Display Rules organize any set of topology objects automatically thereby solving the problem of the manual method. These display rules exceed current auto-layout algorithms for displaying objects in one viewing layer, with their ability to display objects in multiple viewing layers, including the automatic generation of those layers. The basic assumption is that each Object and Link is from a specific class (e.g. NT, Unix, IP, interface, disk, parent, dblink, NFS, etc.) with multiple attributes (e.g. name, ip address, physical address, processid etc.). Using that assumption, Display Rules are created that are easy to define, modify and generate the customized views required by a user automatically rather than manually. In addition, the user is able to personalize the setup of each icon, label, status, event or command of each topology object per service view or the layout of any viewing layer.

The TIS supports one or more of the rules described herein for organizing any set of topology objects.

1. Link Rules definition

Link rules define the links that create new viewing layers in the view. By default, both sides of the link are in the same viewing layer.

In addition, the link rule indicates:
1) Who is the "Parent" in the relation—End1 or End2.
2) If the "Child" should be presented in the "Parent" layer as well.
3) If the "Parent" should be presented in the "Child" layer as well (Brother).
4) Link rules can be used to tell the system to ignore viewing the child as well (Used in circular graphs)

The TIS Display Rules define three (3) types of link rules:
A. Independent Link Rules
B. TQL link Rules
C. Indirect Link Rules 2. Independent Link Rules Independent Links are always in the format of a triangle. The definition of an Independent Link is as follows:

End1_Instance.Link_Instance.End2_Instance

Where,

End1_Instance==
   End1_Class:Attr1,Value1:Attr2,Value2: . . . : Attrn, Valuen

Link_Instance==
   Link_Class: Attr1,Value1: Attr2,Value2: . . . : Attrn, Valuen End2_Instance==
   End2_Class: Attr1,Value1: Attr2,Value2: . . . : Attrn, Valuen It should be noted that Independent Link Rules can exist outside of the context of the TIS.

3. TQL Link Rules

TQL Rules assume that a TQL has already been generated (See the TIS definition). "TQL Link" rules are defined based on the relationships in the TQL. The difference between TQL relationships and independent links is that the TQL rules are context sensitive, for example, as shown in FIG. 6.

Figure 6:
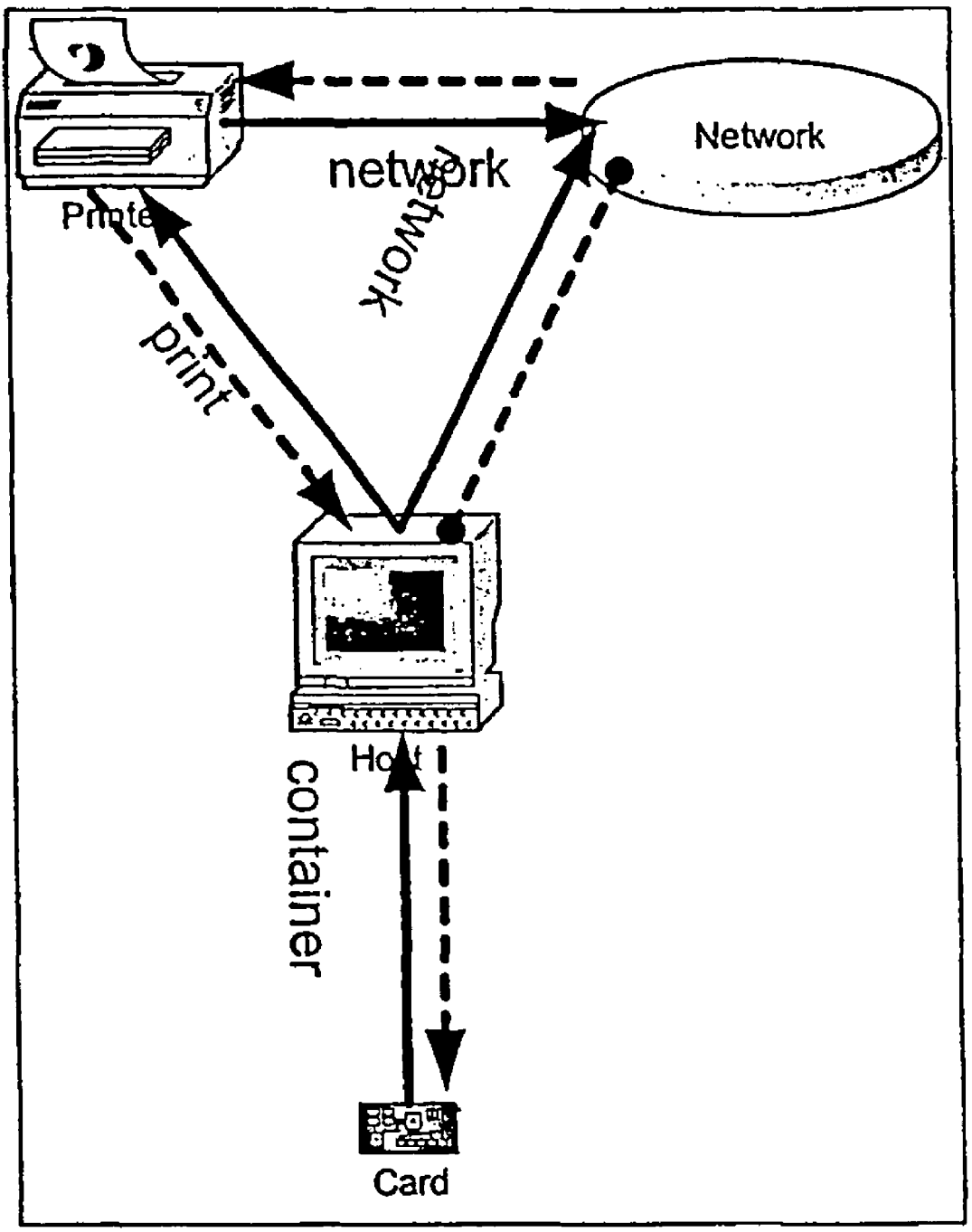
FIG. 6 shows an example of a context sensitive TQL.

FIG. 6 shows the TQL definition of a printing service that includes all the network printers in the enterprise, the users that print on each printer including the network object of the users and printers and the Network Interface Card or NIC (IP, Mac etc.) object of the users. The output of that TQL may include thousands of printers, users, networks and NICs. The Display Rules enable the manager to organize this example printing service in manageable views.

In the top-layer the manager (of the management system) can see the networks to be managed
   Clicking on each network the manager can see the Printers on that network
   Clicking on each printer the users that print on that printer will be revealed, and can even be from multiple networks.
   Clicking on each user computer (Host), the manager can see the specific computer NIC.

Figure 7:
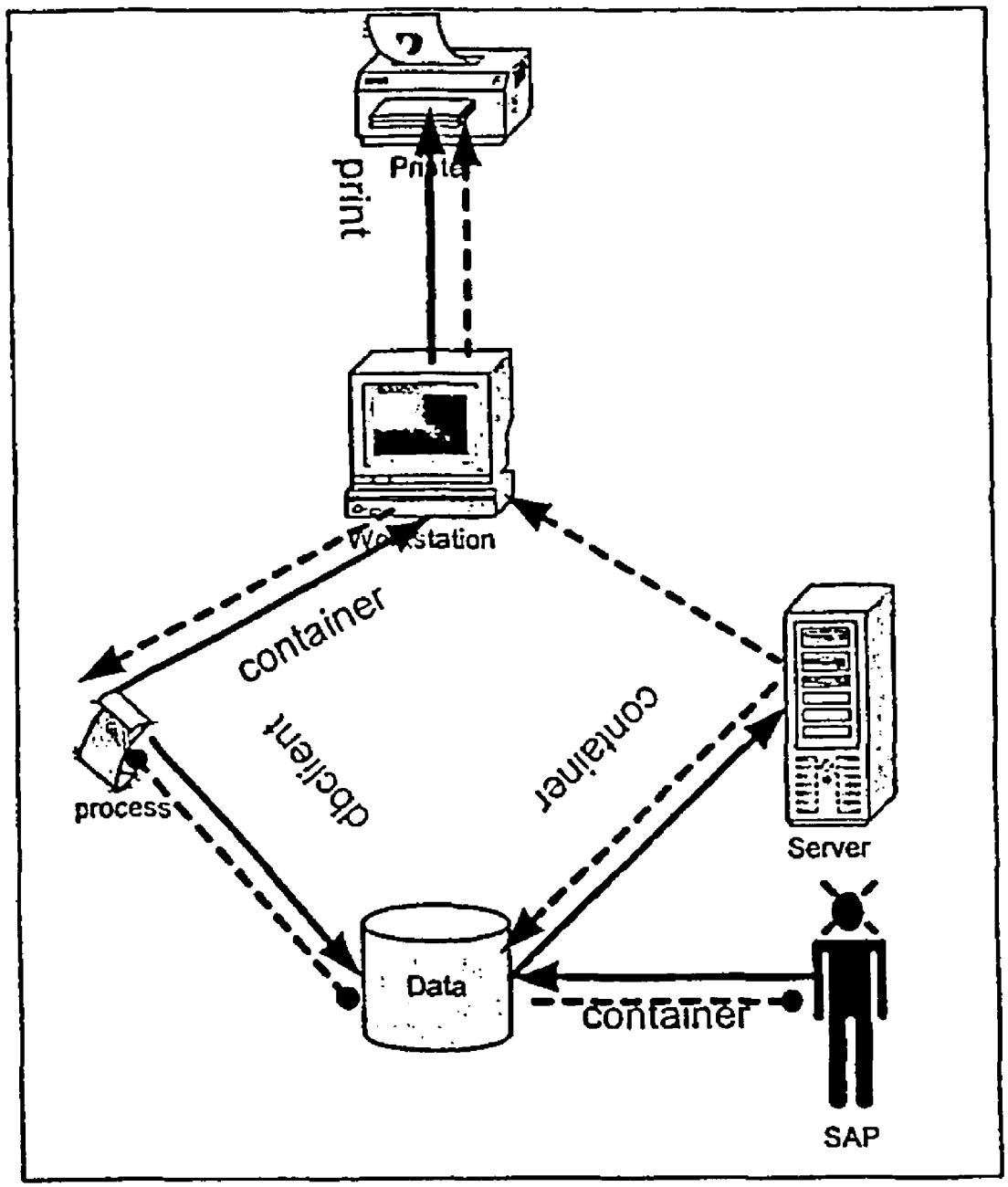
FIG. 7 shows a second example of a TQL Rule.

A second example of a TQL Rule is shown in FIG. 7. FIG. 7 shows a higher-level business service that includes the core database with a SAP user. This class of user is used to filter the SAP database from all of the databases in the Information Base and those select users that connect to that database and in parallel print reports to network printers. The top-layer view of that business service includes all the database servers that match that TQL. Clicking on each server, the manager can see the database and the users connected to that database. Clicking on the user computer, the manager can see the printer(s) used by the service user and the processes (applications) that connect that user to the database.

4. Indirect Link Rules

Indirect Link Rules enable the user to define links that do not exist in the Information Base by providing the "path" of classes that define "virtual links" between topology objects. They correspond to All the dashed links that don't have parallel links in FIG. 7, FIG. 9 and FIG. 10.

5. Group By

The "Group By" rule associates an attribute (or the Class of the child) to a specific Independent Link or TQL Link Rule in order to create a new viewing layer. An example of a Group By rule is shown in FIG. 8.

Figure 8:
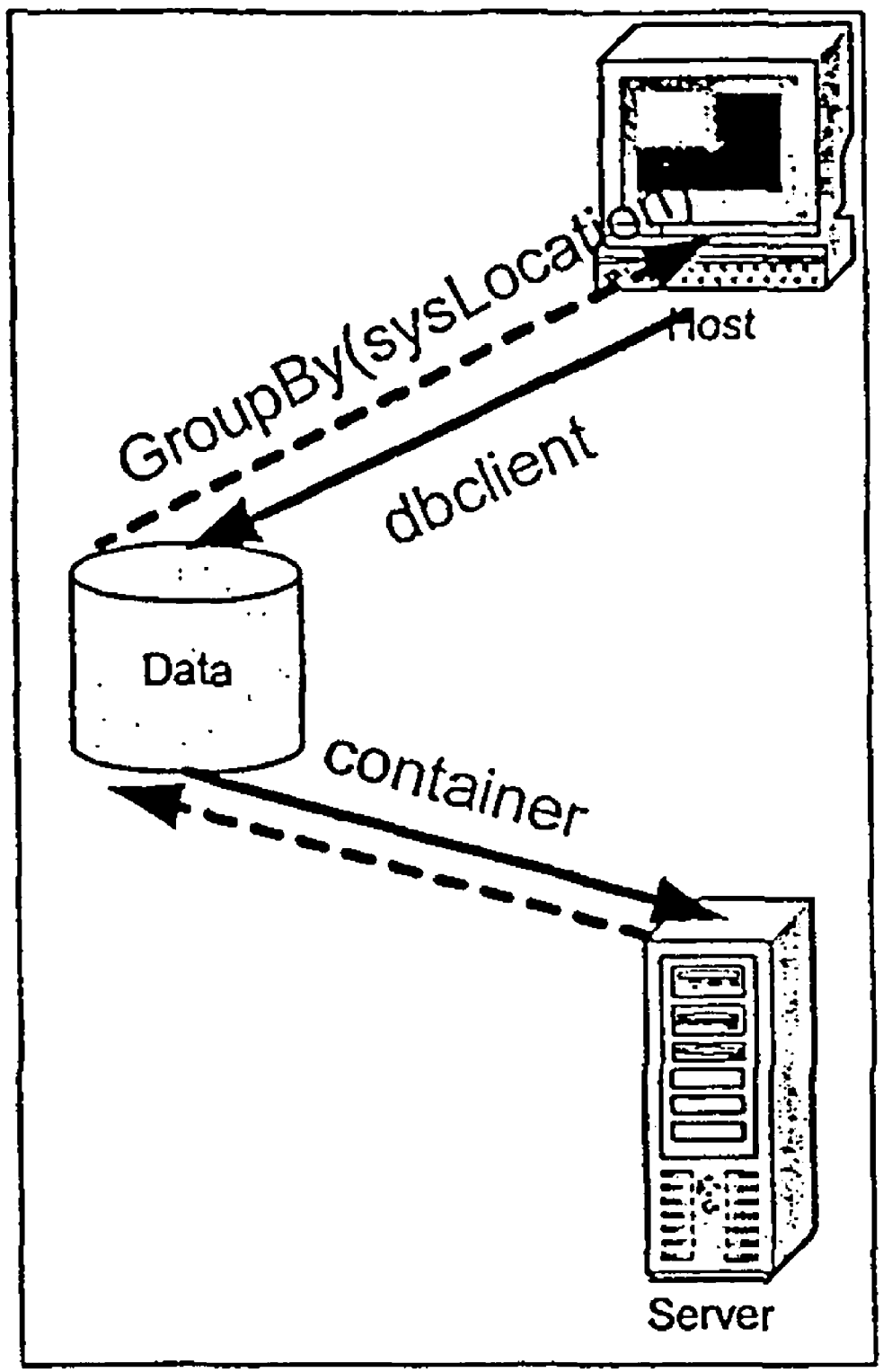
FIG. 8 shows an example of a Group By rule.

FIG. 8 shows the concept of the "Group By" Display Rule using a simple TQL based upon the database and the users in the topology that connect to that database. The number of users may be too large to manage in one layer so a manager may want to group them by their locations. The "Group By" Display Rule enables grouping classes by any attribute, such as the SNMP SysLocation attribute. In the top-layer of this example service view are the database servers, clicking on each server the Manager can see the database, clicking on the database the manager can see the group of locations and by clicking on each location the manager can see the service users that connect to the database from that location.

6. Folders

Figure 9:
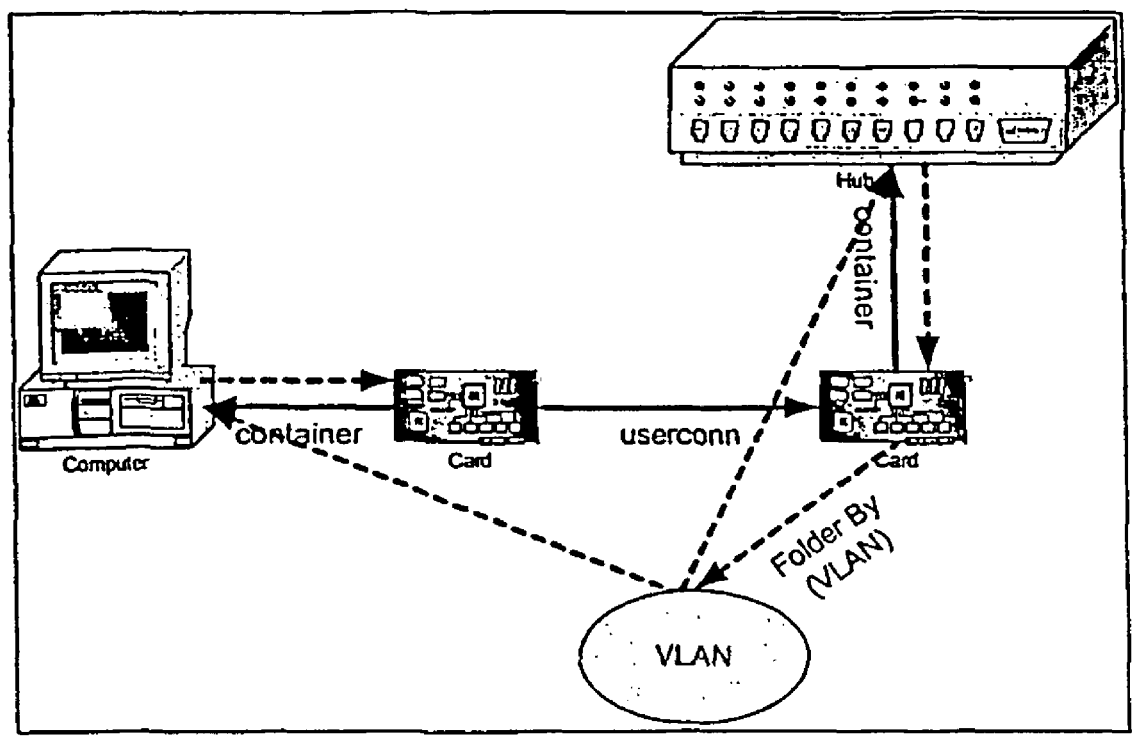
FIG. 9 shows an example of a Folder rule.

Folders virtually expand the Information Base as part of the Display Rule process. The extended Information Base helps to organize the knowledge better. This can be a recursive process whereby the Information Base can itself be expanded as part of the process of defining and using Display Rules. The example rule shown in FIG. 9 illustrates a folder. The example rule shown in FIG. 10 illustrates multiple folders.

The VLAN object in FIG. 9 is not part of the initial Information Base since the Class Model doesn't yet include the class VLAN. In order to manage network switches (hubs) by VLANs, the Display Rules allow the manager to create Folders by any object attribute (e.g., the card VLAN attribute in the example) and use them as standard objects in the TQL, defining new TQL Display Rules that include them. The top-layer of the resultant service view are all the VLANs, by clicking on each VLAN the manager can see the switches and users on that VLAN and by clicking on the Switch or the user computer the manager can see the relevant network cards.

Figure 10:
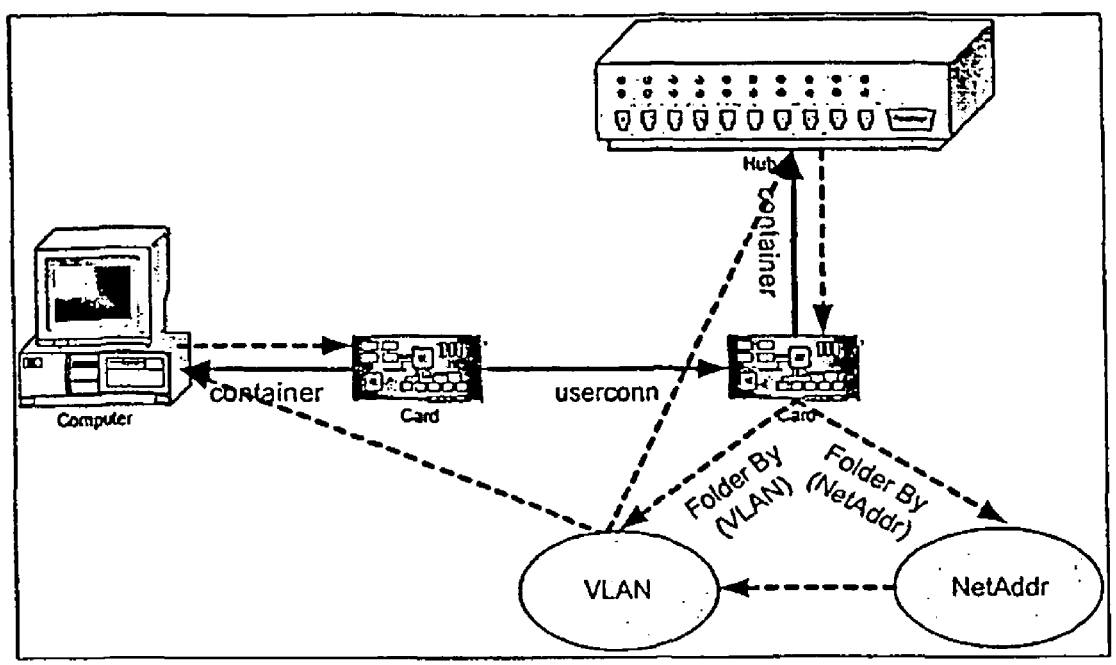
FIG. 10 shows an example of a multiple-Folder rule.

FIG. 10 is similar to FIG. 9 with the addition of the netaddr Folder. This additional netaddr Folder enables the manager to manage all of the network devices beginning with the networks (netaddr) on the top-layer and then the VLANs, Switches & Computers and Cards.

7. Generic Display Rules

Generic Display Rules allow the manager to generate multiple layers in the service view that are very manageable without comprehensive knowledge of the managed service based upon the output of the TQL. The TIS supports some of the following parameters:

1) Max number of Objects in map (M)—Indicates that the manager prefers to see no more than the quantity (M) of objects under the Max number of objects constraint.
2) Maximize Objects in Map (True/False)—Indicates that the manager prefers to see more information than less (may be in conjunction with the Max objects constraints). If the number of objects in the map is small, the manager wants to see the bottom layers in their parent layers.

3) Sort by attribute—If M exceeded sort and group objects by some attribute (See the Group By and Folder options).
4) Class weights—Give each Class a specific weight and use it to select the preferred objects in each layer (Using some internal algorithm).
5) Link weights—Give each Link a weight and use it to select the preferred objects in each layer (again, using some internal algorithm).

Class and Link Weights enable the user to select the most important objects that will be presented in the top-most layers of a view. For example, if all the weights are 1, the most connected objects will be presented in the top-most layers.

It should be noted that the display rules described herein are only illustrative. Any available display rules that enable the automatic organization of any set of topology objects are within the scope of the disclosed teachings.

I.E. Event Correlation

An important aspect of the disclosed teaching is the TIS event correlation that is described herein. The TIS event correlation is performed by the Correlation sub-system 1.4.

1. The Problem

"Event Correlation" is a well-known issue in the NSM market. NSM "monitors" standard method for event correlation can generate a huge number of "events" indicating that something, somewhere in the managed world has happened. However, these NSM monitors generate such a large quantity of seemingly random events that the user cannot effectively understand or manage in such an "information overload" environment.

Any reasonable solution to this problem requires significantly reducing the amount of events and notifying the user just about the root cause(s) of the problem(s) that generated the events The TIS Event Correlation sub-system improves upon the conventional NSM monitor method by converting Events to Objects and manipulating them as part of the Information Base. It then uses the knowledge of all the connections in the Information Base to identify the root cause(s) of problem(s). This knowledge makes it possible for the TIS Event Correlation Sub-system to understand highly complex scenarios of events and pinpoint the root cause of a problem within the managed world.

2. Description

The TIS Event Correlation sub-system is composed of some of the following components:
1. Event Rules—User defined rules that control the Event life cycle.
2. Time Rules—Internal scheduler that control the Events and "regular" objects and links life cycle.
3. Topology Rules—User defined rules on the Information Base relationships.
4. Root Cause Detection Utility—based on the output of the Topology Rules.
5. Events TQLs—Event Rules transform events from "Event" format to "Object" format with the "Container" link to the parent object. Event TQLs enable the definition of complex scenarios of events using TQL patterns.

Each of the components is described herein in further detail.

3. Object State Management

The TIS handle Events, Objects and Event Objects. To do so, each event is referenced to some object (by the Object field in the Event). Event Rules are used to create and handle Event Objects as children of the referenced objects. One of the basic fields of any Event is its Severity. Event Severity can be expressed as any non-negative integer. Any object in the TIS can have 3 states: Operation State (or just State), Correlation State and Administration State. The Administration State is managed by external systems (Users, Collection System etc.), the Correlation State is controlled by the Topology Correlation Sub-system (especially in the Topology Rules) and the Operation State can be setup directly or computed automatically according the following definition:
Event Object State==The Event Severity
Object State=Maximum Event Object State of the Object (where the Event Object is Active)
Event Objects can be Active or InActive for Historical use.

4. Event Rules

The Event Rules component controls the life cycle of Events from their Event stage to Event Object Stage (whether Active or InActive) and within their Event Object Stage. Event Rules actions enable the subsystem to create, remove, clear and modify Event Objects, as well as modify their parent object. Event Rules utilize one or more of the Event Actions: Simple Actions and Functions. Which Event Action is invoked is determined by the first Event Selector (Event, Object or Container Selector) whose condition is true.

a) Simple Actions

Simple Actions are the basic operations on the Event and all of the other events on the same object. Some of the Simple Actions that may be performed by Event Rules include:
Skip—don't convert the Event to an Event Object
Log—Log the Event in the History Database
Continue to next rule (By default the Event Correlation engine exit after the rule)
Create—Create a new Event Object from the raw Event
Recreate—Update all fields, Set isActive=True and Increment the Create Counter
Time—Update the Event Object Timestamps
Last—Update the Last Timestamps
Replace—Update the Event Severity field and the Replace Counter
Message—Update the Message Section of the Event
Count—Increase the Event Count field
Reset—Reset the Event Count field (Value==1)
Clear—Deactivate the Event Object (Set isActive=False)
Clear All the Event Objects of the same Container
Remove—Remove (delete) the Event Object
Remove All the Event Objects of the same Container
Acknowledge All the Event Objects of the same Container.

b) Functions

Functions require parameters as part of the Action definition. Parameters can be static or dynamically calculated from the event fields. Functions enable the manager to control the event fields, other events, the container object attributes etc. Some of the Functions that need to be performed by Event Rules include:
Set Field (Index, Rule)—Set one of the Event Custom Fields
Clear Other (EventdID)—Use one Event to Clear other Event Object in the same Container Object
Remove Other (EventID)—Use one Event to Remove other Event Object in the same Container Object
Set State (Value)—Set the state of the Container Object
Set Corr State (Value)—Set the correlation state of the Container Object
Set Container (Attribute, Value)—Set attribute of the Event Container Object.

c) Event and Object Selectors

Event and Object Selectors select which Action will be executed based upon the first matching selector. The Event Rule Table defines the Event Actions using the Event fields and the Event Object fields (if these already exist, otherwise the Object is Null). The following are some of the pre-defined Event Rules:

TABLE 1

Event Rules

| Event Selector | Action |
|---|---|
| Event · Object = Null | Skip |
| Event · Subsystem NOT IN (World, Collection) | Skip |
| Event · Severity = 1 (Normal) | Clear Last |
| Event · SUbSystem = World Event · Eventid = AdminStateChange Event · Severity = 12 {Unknown} | Clear All Create |
| Event · Subsystem = World Event · Eventid = StateChange Event · Severity = 10 {Down} | Clear All Create |
| Event · Subsystem = World Event · Eventid = CorrStateChange Event · Severity >= 5 | Acknowledge All Create |
| Object = Null | Create |
| Object · IsActive = False | Recreate |
| Event · Severity = Object · Severity | Replace Time Reset |
| Event · Message = Object · Message | Message Last |
| Event · Severity = Object · Severity | Count Last | d) Container Selectors

Container selectors use (in addition to the Event and Object Selectors) the attributes of the container object of the event (The object that the event points to).

For example: Container.AdminState !=0 (Manage)→Skip

5. Time Rules

Unlike Event Rules that are triggered by incoming events to the system, time rules run periodically and maintain the existing event objects and objects (Escalate their severity, Clear events, Remove event objects, Remove objects, etc.) The Time Rules produce the Time Actions that include:
  a) Event Handler
  Escalate the Event Severity
  Clear—Deactivate the Event Object (Set isActive=False).
  Remove the Event Object
  b) Object Handler
  Delete objects The Time selector uses the class of the object as the source of the rule. Event handling is done using the Event class. Time Rules used in addition to the Now timestamp.

The following are some of the Pre-defined Time Rules:

TABLE 2

Time Rules

| Selector | Action |
|---|---|
| Event · IsActive = True Now − Object · LastTimestamp > 24*60 | Clear |
| Event · IsActive = False Now − Object · ObsoleteTimestamp > 7*24*60 | Remove |
| Event · IsActive = True Object · Severity < 9 Now − Object · LastTimestamp > 3*60 | Escalate |
| IP · State = 10 {Down} IP · UpdateTime > 7*24*60 | Delete |
| Process · State = 10 Process · UpdateTtme > 60 | Delete |

TABLE 2-continued

Time Rules

| Selector | Action |
|---|---|
| Object · State = 10 Object · UpdateTime > 30*24*60 | Delete |

6. Topology Rules

The Topology Rules propagates the Object States (Operation and Correlation) to its neighbors according to predefined weights defined in the Topology Rule Triggers. The propagators of the Object States are the links that by definition connect two objects (store the affected correlation state either in End1 Correlation or End2 Correlation).

Link End1 Correlation == Max (
End1 State * State Weight, End1 Correlation * End1 Correlation
Weight
Where End1 is the Trigger in the Topology Rules Table)
Link End2 Correlation == Max (
End2 State * State Weight, End2 Correlation * End2 Correlation
Weight
Where End2 is the Trigger in the Topology Rules Table)
Link Correlation State == Max (Link End1 Correlation, Link End2
Correlation)
Object Correlation State == Max (
Links End1 Correlation where it is the End2 of the Link,
Links End2 Correlation where it is the End1 of the Link
)

The Topology Process steps are:
1. The Trigger Object of the Topology Rule is triggered
2. The Topology Rule Links Correlation States are recomputed.
3. For each link, if the Link End1 Correlation State has changed, the Link End2 Object Correlation State is recomputed.

Figure 19:
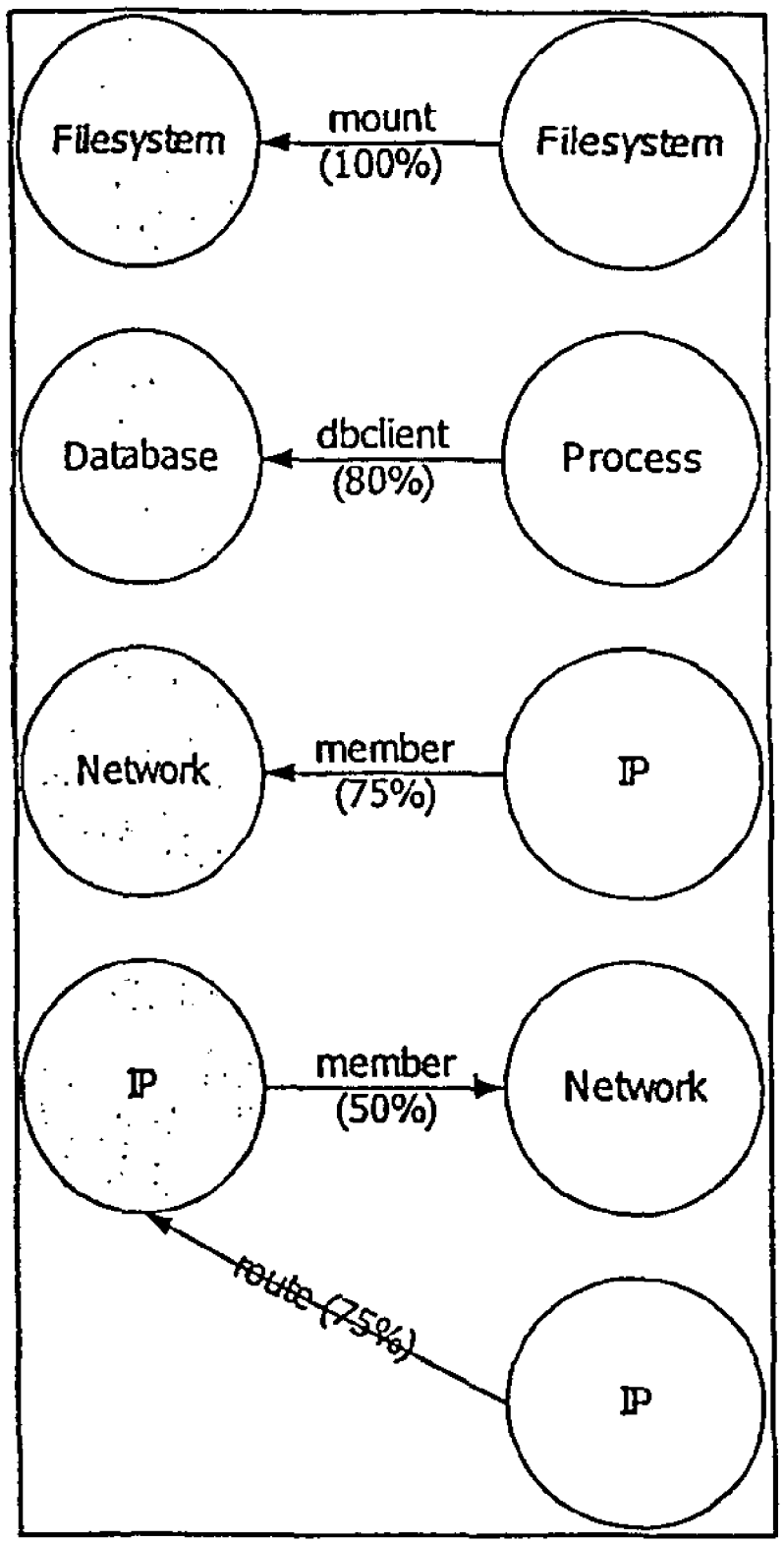
FIG. 19 shows an example of Topology Rules.

The Triggered objects as well as the links that are affected by state changes of those objects is defined by TQL Triggers (Similar to the TDA Triggers of the Collection Sub-system). FIG. 19 shows some examples of such Triggers.

The gray objects are the triggers; the effective weight of the state change is defined on the links (XX %).

7. Root Cause Detection Utility

The ability to detect in real time the root cause of problems is one of the major challenges of management solutions. The Root Cause utility of the Topology Correlation Sub-system uses the Information Base and the Correlation states to address this challenge. This utility is used to either send out specific problem notifications for real problems or by users that browse the Service Views and want to see the root cause of the problematic ("colored") objects (usually the root cause of the problems in the map are not part of the same view). The Root Cause utility is an API that the Topology Correlation Sub-system exports. The input to that interface is an object that has some problems and its output is an object (typically) that is suspected of being the root cause of the problem.

Figure 11:
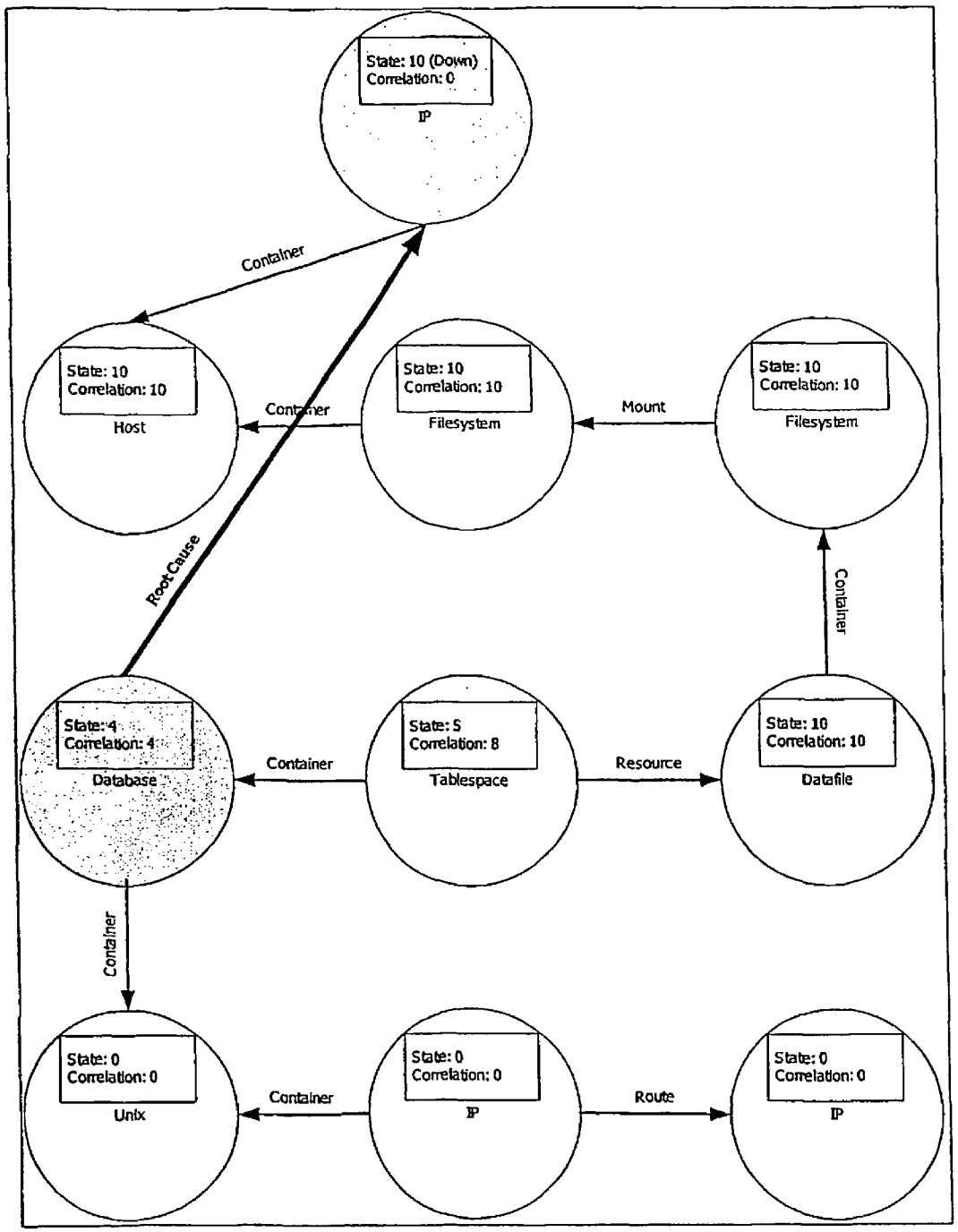
FIG. 11 shows an example illustrating the power of the disclosed root cause utility.

FIG. 11 shows a snapshot of the Topology Database with the path between the problem's root cause (the failed IP) to the problem that the user wants resolved (the Database problem). The path includes the Database, tablespace, datafile, filesystem, remote filesystem, remote host and the failed IP. FIG. 11 shows the Database host (Unix), its IP and its router that may be the cause of the same problem but not in this case (Their State is 0-OK). Such analysis and utilities are available because of the Topology Database and the Topology Correlation rules.

FIG. 11 demonstrates just one Root Cause object for a specific problem but in actual deployments a few objects may be suspected as the root cause objects. The Root Cause API enables the user to get:

The system preferred object—using the weakest link method

A list of suspected objects

The correlation chain to the suspected object/objects

Other ways based upon the knowledge gained from the topology rules

8. Event TQLs

Event TQLs are TQL patterns that are defined by combination of objects and event objects. The transformation of events to objects enables to detect complex situations. The consumers of that feature are users that don't want to browse the service views and are interesting just on being notify when something happened. When Event TQL is detected (the result is not null) specific Event is sent and the user is able to catch it for his notification purposes (using the Event Notification option). When the Event TQL is no longer active (the result is null again) clear Event (the same event with severity NORMAL) is sent to notify its consumer again. In addition, like any TQL, the consumer is able to query the runtime objects and event objects that triggered the Event TQL.

The Time Rules enable the manager to control how long Obsolete (IsActive=False) Events will stay in Object mode. This control enables the manager to create Event TQLs that correlate between Events in different times.

Figure 12:
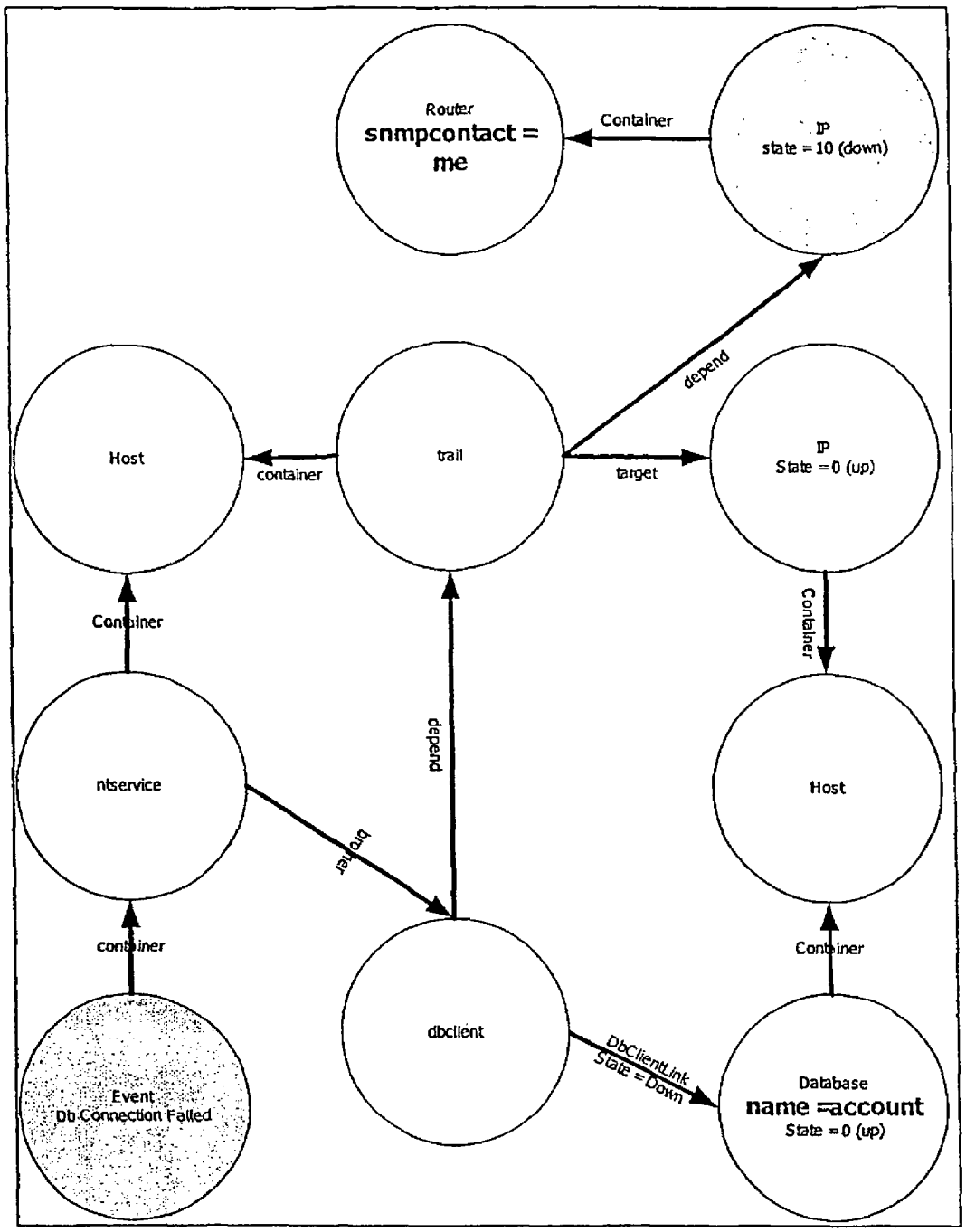
FIG. 12 shows an example of an event TQL.

FIG. 12 shows the TQL definition of a complex scenario. The event "Db Connection Failed" is generated by the ntservice that its process (dbclient) connects to the account database. The Topology Collection Sub-system discovers and automatically maintains the paths between the dbclient host to the database host. The relevant class model classes are the trail object, the target link and the depend link. The routers that me maintains may or may not be in the path between the client to the database, if they are, me will be notified.

I.F. TQL Language Specification

Herein, an exemplary embodiment of a Topology Query Language (TQL) that is part of a TQL system is discussed. TQL is a unique language that extends the functionality of the standard SQL—Structured Query Language to the domain of Topology Databases. The purpose of TQL is to make queries easy and intuitive, to let the client define complex relationships and conditions in the most symbolic and simple way that is close to client's view of his data.

It should be noted that the specific TQL patterns and their syntax discussed herein are only illustrative. Any topology language that can query a topology database is within the scope of the disclosed teachings.

1. Fundamentals

Owner each TQL has an owner that is the TQL creator and controller (Shares, Access control etc.).

Node/Vertex defines group of objects that share common attributes.

Edge defines a group of conditions unifying dependency between nodes.

TQL composed of Nodes and optional Edges—For each TQL the TQL subsystem assigns a unique TQL Id (Used in TQL Changes Events and TQL Queries).

Node Id/Edge Id—each Node/Edge is labeled with a unique number, each Topology Object/Link result will be attached to this Id.

Tag—list of Nodes/Edges that are marked with symbolic name, the same node may appear in more then one tag. Tags denote specific knowledge of the TQL pattern that can be used by users that browse the output of the TQL pattern (i.e., the managed Business Service). Example of Tags can be: TierX, Server, Client, CriticalService etc.

2. Single TQL Node

Figure 13:
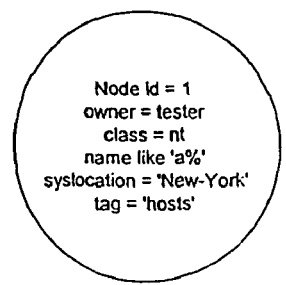
FIG. 13 shows an example of a single TQL Node.

An example of a single TQL Node, which is shown in FIG. 13, enables the manager to create a Structured Query very similar to the Structured Query Language (SQL). For example:

SELECT ALL OBJECTS WHERE CLASS ATTRIBUTE IS 'NT' (without inheritance) AND WHERE NAME ATTRIBUTE STARTS WITH 'a' AND WHERE SYSLOCALTION ATTRIBUTE is 'New-York'.

3. TQL Lib

The TQL Lib stores all the defined TQLs for future use (Views, TDA Triggers,Topology Rules, etc.)

The following identifies each TQL in the lib:

Owner

Name

Version

Description

4. Operators a) Class Operators

==-Exact equation

=-Derived classes (default)

b) Single Attribute Operators

Attribute <op> Value. Available operators:

=

>

<

>=

<=

!=

Like

!Like

In (a..b, c..d)

Size (Applicable for attribute lists only)

Any other SQL operator c) Object Statistics Operators

Used to select chosen objects.

Max( )—Select the object that have the maximum value in the specified context

Top(N)

Min( )

Average( )

Figure 14:
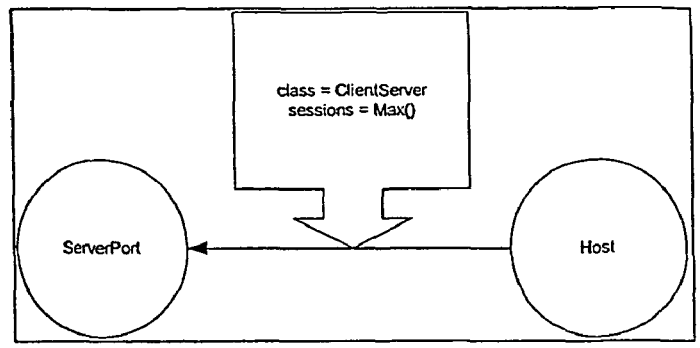
FIG. 14 shows an example of a TQL Max( ) Operator.

FIG. 14 shows an example of a The TQL Max( ) Operator. The TQL defines those Hosts connected to ServerPort with a link of Class ClientServer. The Topology Collection Sub-system maintains for each ClientServer link the number of sessions from the Host to the Server (the user may open a few sessions to the same server). The max( ) operator enables the manager to see only the Hosts with the maximum session counter to each ServerPort. (e.g., if the maximum session counter is 3, all hosts with 3 sessions are viewed)

d) Attributes' Expressions Operators

For example: attr1>=attr2+attr3.

e) The Any Operator

The Any operator is similar to the Group By in SQL. Using the Any operator in TQL node cause to pre compiling process that creates multiple TQL patterns as children of the parent TQL. The consumer gets the output in bulks per child.

For example (Very simple TQL)—Host: Class=Any will create the following TQLs:

Host: Class='NT'

Host: Class='Unix'

Etc.

f) Variables & References

TQL Variables and References enable to connect the attribute values of different values within a TQL node or among multiple TQL nodes.

For example:

If we have the following TQL:

Host.Container.Object.Link.Object.Container.Host and we want that the Object.Link.Object link will be between objects on different hosts, we will use the variables option the following way:

Host:
Name=X.Container.Object.Link.Object.Container.Host: Name!=X g) Edges

Edge connects two nodes in the graph.

Edge may have a direction.

Graph Edges connect objects from different TQL nodes.

Inner Edges connect objects that are results of the same TQL node.

Real Edge—real world (data) links

Edge Function—Pre defined function that its output may be number of objects and links Edge Constraint—Additional optional constraints on the edge definition (Simple definition include class, attributes, direction etc.) For each Edge end there might be a constraint on the number of links that an object must have with its neighbor.

Edge Constraint Examples:

0 . . . N—Accept Objects with up to N specify links to their neighbors

M . . . *—Accept Objects that have at least M specify links to their neighbors.

0 . . . 0—Accept Objects that don't have any specify link to their neighbors.

1 . . . *—Accept Objects that have the specify link to their neighbors.

0 . . . *—Accept Objects without limit on their neighbors.

Figure 15:
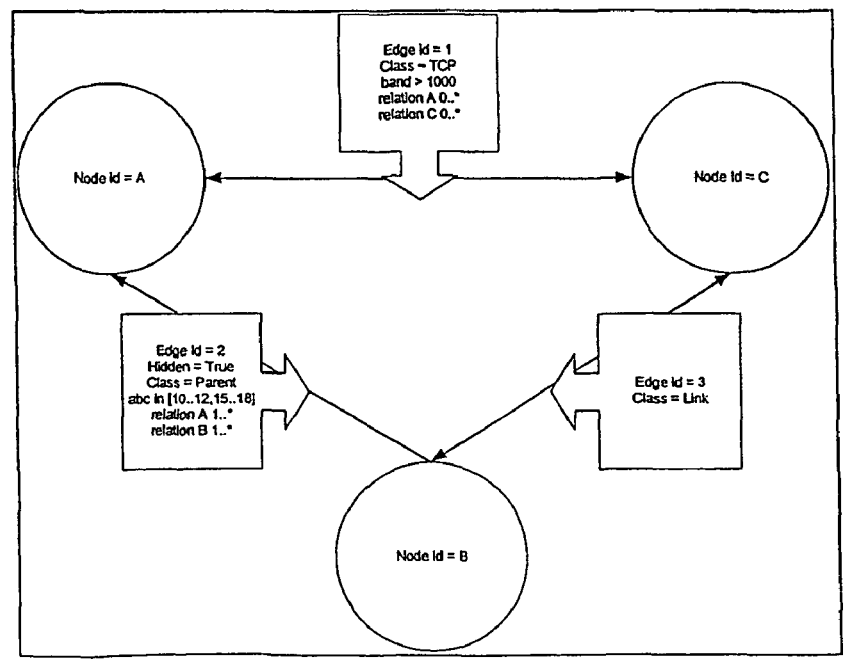
FIG. 15 shows an example of TQL Edges.

FIG. 15 shows an example of TQL Edges.

Edge id 1—Select links that their class attribute is TCP or it's descended, and band attribute is grater then 1000. Links ends should be one of object of node A and the other object of node C, the direction is not relevant.

Edge id 2—Select links that their class attribute is Parent and abc attribute is in range [10 . . . 12, 15 . . . 18]. Links must be directed from object of node B to object of node A (end1 belongs to B and end2 belongs to A). This link condition adds a constraint to groups A and B. Only objects of A and B that are linked by this link will be able to take a part of the result. The links themselves won't be shown (Hidden=True).

Edge id 3—Select all links between objects of nodes B and C without any condition.

h) Edge Functions

Edge Functions are group of pre-defined rules that define a relationship between two nodes objects. Edge functions can be applied on specific edge or as global requirement on the TQL result (On all objects that their classes applicable to the function).

Edge functions can be computed ad hoc without connection to specific TQL.

Figure 16:
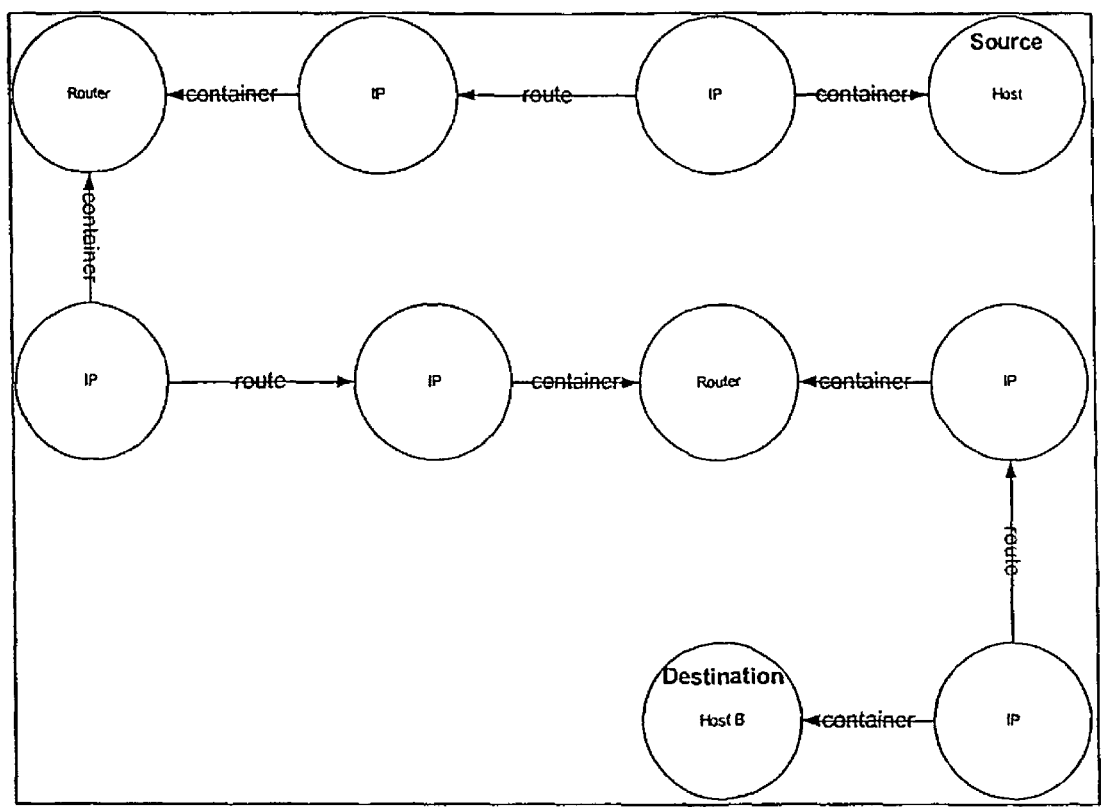
FIG. 16 shows an example of an IP Route function.

(1) Host (Object)
Input: Object
Output: The host of the object (2) Link N (or Link*)
Input: Source object, Link class definition
Output: Paths to all the objects that are the N neighbors of the Source object using Links from the specified link definition (3) All Paths
Input: Source object, Destination object, Link classes' definition
Return value: All the paths between the specified objects including the specified links (4) Shortest Path
Input: Source object, Destination object, Link classes' definition
Return value: The shortest path between the specified objects including the specified links (5) Closest host
Input: host, TQL specify the target hosts
Output: The closest host (6) Route Finds the IP route between two hosts. The route function calculates the path between the source and the destination using the available information in the Information Base (This function is different than the well known Traceroute function that requires connectivity when it is invoked). The route function looks for the relevant route and container links in the Information Base. The path will always be in the format as shown in FIG. 16: Host, its IP, route to some router IP, then the router, its IP that points to the next IP etc. etc. until the IP and the destination host.

(7) Layer2

Figure 17:
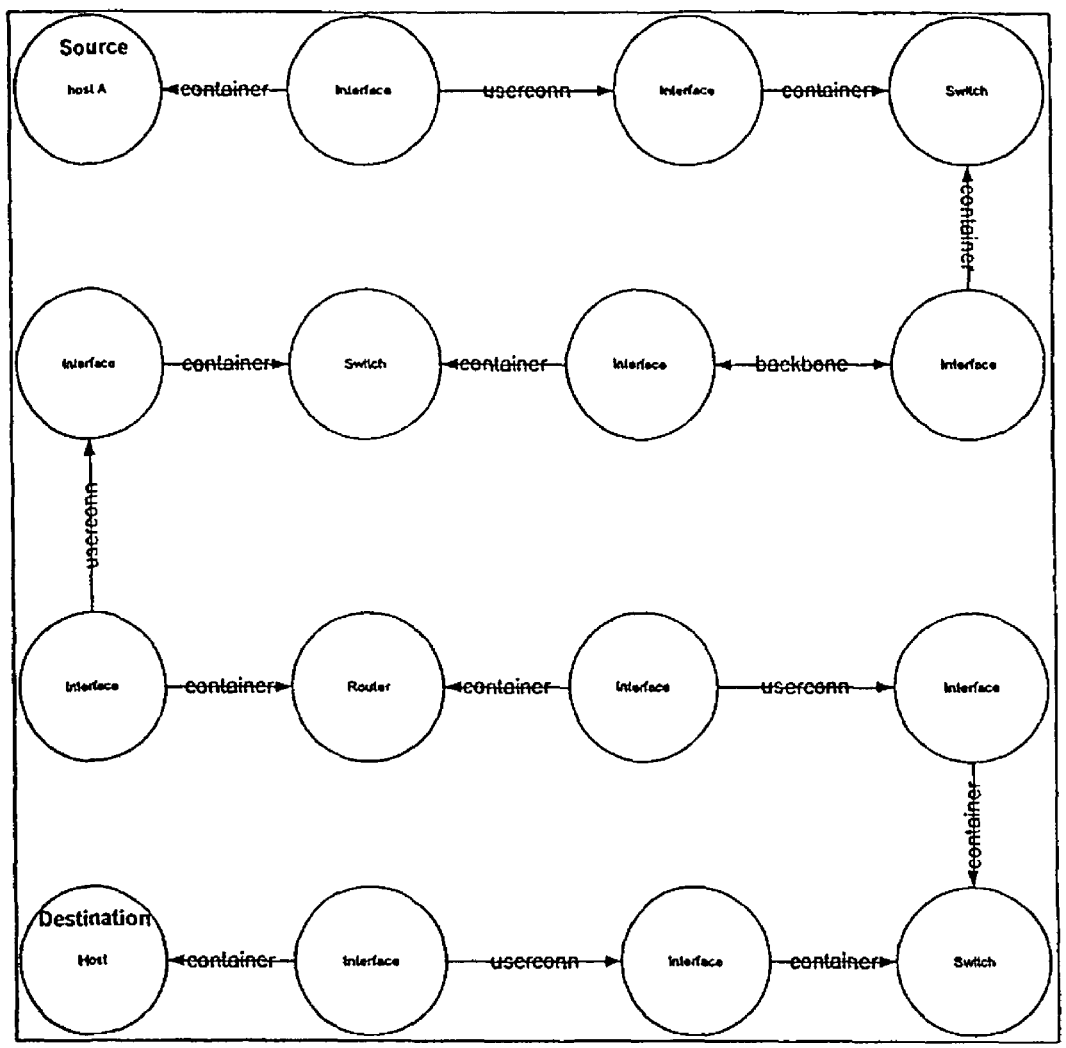
FIG. 17 shows an example of Layer2 trails.

Finds the Layer2 trail between two hosts. FIG. 17 shows an example of Layer2 trails.

In order to detect the real cause of network problems one should know the physical path between the Source and the Destination. The physical path is calculated by the Layer2 TQL function that uses the userconn and backbone links between hosts and switches interfaces.

i) Operational Modes (1) Registration
Browse the TQL Lib for Existing TQL
TQL Registration and Activation/Deactivation
Define the TQL Result set—By Class, By TQL Node (2) Events
Listen to Registered TQL Changes (New, Del, Modify of specific Result Set)
Listen to TQL Bulk Change Event (and then get the TQL result)
Listen to TQL has data Event (Use in Events TQL)

(3) Queries
Check if Registered TQL has data
Get Result By Registered TQL
Query for Subset of the TQL—By Class, By TQL Node, By Tag
Check if specific Object is in TQL
Query the Links of specific object in the TQL context (4) Ad-hoc mode
Get Result By Ad-hoc TQL
Get Result by Ad-hoc TQL Edge function Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A topology information system, comprising:
   a topology collection sub-system including at least one topology discovery agent, said topology collection sub-system automatically collecting topology information from at least one topology layer of at least one managed world;
   a topology database, that is adapted to store the topology information collected by said topology collection sub-system;
   a topology query sub-system adapted to query the topology information stored in said topology database using a topology pattern query created by a user; and
   a topology viewing sub-system adapted to display a view of the topology information, wherein the viewing sub-system displays topology information in multiple viewing layers and automatically generates the viewing layers based on a user defined display rule.

2. The system of claim 1 further comprising a topology correlation sub-system that is adapted to monitor said topology database for changes that indicate faults within the managed world.

3. The system of claim 2 where the correlation sub-system uses the topology information to correlate between the faults.

4. The system of claim 1, wherein the topology collection sub-system is self-maintaining.

5. The system of claim 1, wherein the system provides the user with an ability to teach the system how to discover, recognize and view the managed world.

6. The system of claim 1, wherein the system adapts to any change in the managed world utilizing its learned knowledge.

7. The system of claim 4, wherein the topology collection subsystem interrogates proxies corresponding to at least one topology discovery agent (TDA) and automatically deploys additional TDAs and TDAs tasks according to topology query language (TQL) triggers.

8. The system of claim 4, wherein TDAs corresponding to tasks that are decommissioned are removed.

9. The system of claim 1, wherein at least one topology pattern is defined using a topology query language (TQL).

10. The system of claim 1, wherein the at least one display rule enables the user to personalize views and the manner in which topology objects are displayed.

11. The system of claim 1, wherein the at least one display rule is used to automatically organize any set of topology objects in a hierarchy of viewing layers.

12. The system of claim 1, wherein the viewing sub-system is self-maintaining.

13. The system of claim 10, wherein the personalization enables the user to setup an icon, label, status, an event, a command of each topology object per service view or layout of any viewing layer.

14. The system of claim 1, wherein the topology database is an object-oriented graph, further wherein vertices of the graph represent objects and the edges represent links between the objects.

15. The system of claim 3, wherein at least one class model is created that define an information base that represents the managed world.

16. The system of claim 15, wherein the class model is extendible.

17. The system of claim 15, wherein the class model definition includes objects, links and all available relationships between topology objects.

18. The system of claim 15, wherein the topology collection subsystem is used to populate the information base.

19. The system of claim 18, wherein the query is applied to the information base to create a knowledge base.

20. The system of claim 19, wherein the knowledge base is organized using at least one display rule.

21. The system of claim 20, wherein the query is in a topology query language (TQL).

22. The system of claim 20, wherein the display rule is a independent link rule.

23. The system of claim 20, wherein the display rule is a group by rule.

24. The system of claim 20, wherein the display rule is a folder rule.

25. The system of claim 20, wherein the display rule is a general rule related to algorithms for a multi-layer hierarchy.

26. The system of claim 22, wherein the independent link rule is based on a triangle formed from a object class, a link class and another object class.

27. The system of claim 20, wherein the display rule is an indirect link rule.

28. The system of claim 27, wherein an indirect link is a path comprised of multiple links.

29. The system of claim 2, wherein said correlation sub-system further comprises at least one event rule that converts an event to an object format.

30. The system of claim 2, wherein said correlation sub-system further comprises at least one time rule that controls events and objects life cycles.

31. The system of claim 2, wherein said correlation sub-system further comprises at least one event rule that controls a life cycle of an event.

32. The system of claim 2, wherein said correlation sub-system further comprises at least one topology rule that propagates a state of at least one object to its neighbor's correlation state.

33. The system of claim 21, wherein said correlation sub-system comprises at least one event TQL rule that searches for problems using TQL definition of objects, links and events, wherein said events are also represented as objects.

34. The system of claim 2, wherein said correlation sub-system further comprises a root cause detection utility.

35. The system of claim 1, wherein said topology query sub-system is self-maintaining.

36. The system of claim 1, wherein said topology query sub-system reacts to any input from said collection sub-system.

37. The system of claim 9, wherein said topology query sub-system updates users of any changes in a TQL result set.

38. The system of claim 34, wherein the root cause detection utility provides root cause information based on an information base and correlation states.

39. The system of claim 38, where the root cause detection utility is provided as an API that is exported by said topology correlation sub-system.

40. The system of claim 39, wherein an input to the root cause detection utility is an object that has come problems and an output of the root cause detection utility is at least an object that is suspected as being a root cause of the problem.

41. The system of claim 34, wherein using the root cause detection utility, a user can query the system regarding a hypothetical faulty scenario.

* * * * *

UNITED STATES PATENT AND TRADEMARK OFFICE
CERTIFICATE OF CORRECTION

PATENT NO. : 8,255,513 B2  Page 1 of 1
APPLICATION NO. : 10/450242
DATED : August 28, 2012
INVENTOR(S) : Shmuel Assa It is certified that error appears in the above-identified patent and that said Letters Patent is hereby corrected as shown below:

In the Claims:

In column 18, line 57, in Claim 40, delete "come" and insert -- some --, therefor.

Signed and Sealed this
Twenty-first Day of May, 2013

Teresa Stanek Rea
*Acting Director of the United States Patent and Trademark Office*